(12) United States Patent
Ker et al.

(10) Patent No.: US 7,884,617 B2
(45) Date of Patent: Feb. 8, 2011

(54) ESD DETECTION CIRCUIT AND RELATED METHOD THEREOF

(75) Inventors: Ming-Dou Ker, Hsinchu (TW); Po-Yen Chiu, Taipei (TW); Chun Huang, Taipei (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 309 days.

(21) Appl. No.: 12/334,496

(22) Filed: Dec. 14, 2008

(65) Prior Publication Data

US 2010/0148797 A1    Jun. 17, 2010

(51) Int. Cl.
    *H01H 31/02* (2006.01)
(52) U.S. Cl. .................. 324/555; 361/56; 257/173; 257/360
(58) Field of Classification Search .................. None
    See application file for complete search history.

(56) References Cited

U.S. PATENT DOCUMENTS

| | | | | | |
|---|---|---|---|---|---|
| 5,946,177 | A | * | 8/1999 | Miller et al. | 361/56 |
| 5,959,488 | A | * | 9/1999 | Lin et al. | 327/313 |
| 7,586,721 | B2 | * | 9/2009 | Wang et al. | 361/56 |

* cited by examiner

*Primary Examiner*—Minh N Tang
(74) *Attorney, Agent, or Firm*—Winston Hsu; Scott Margo

(57) ABSTRACT

An electro-static discharge (ESD) detection circuit is provided. The ESD detection circuit includes: a first power pad for receiving a first supply voltage; a second power pad for receiving a second supply voltage; an RC circuit having an impedance component coupled between the first power pad and a first terminal and having an capacitive component coupled between the first terminal and a second terminal, wherein the second terminal is not directly connected to the second supply voltage; a trigger circuit couples to the first power pad, the second power pad, and the RC circuit, for generating an ESD trigger signal according to a voltage level at the first terminal and a voltage level at the second terminal, and a bias circuit coupled between the first power pad and the second power pad for providing a bias voltage to the second terminal.

16 Claims, 8 Drawing Sheets

ESD DETECTION CIRCUIT AND RELATED METHOD THEREOF

BACKGROUND OF THE INVENTION

1. Field of the Invention

The present invention relates to ESD protection, and more particularly, to an ESD detection method and related method thereof for ESD protecting circuits applying electronic elements complying with a nano scale process.

2. Description of the Prior Art

The development of semiconductor processes is ongoing. As one skilled in the art will appreciate, a modern chip is allowed to have a plurality of various electronic circuits configured within. Moreover, electronic pads are disposed on each chip for receiving an external power source (e.g., a bias current/voltage) and for exchanging data with other external electronic circuits/chips. For instance, a chip has power pads implemented for receiving bias voltage(s), and signal pads for receiving input signals and output signals. The above-mentioned signal pads are named I/O pads.

That is, the chip is connected with external electronic circuits or chips via the aforementioned electronic pads. However, during processes such as packaging, testing, delivering, and manufacturing, etc, the chip can be damaged or interfered with by the external static electricity via the electronic pads (power pads and signal pads) of the chip. External static electricity easily damages inner circuits in a chip via the electronic pads, and the unwanted condition causing the inner circuits of a chip to be damaged or interfered with is called electrostatic discharge (ESD). Providing excellent ESD protection circuits for protecting modern integrated electronic circuits (e.g., a chip) from being damaged by the unwanted ESD noise is an important issue for designers.

In general, ESD protection circuits are disposed between two pads of the chips. The said ESD protection circuits are basically implemented for providing a bypass path with a low equivalent impedance value for bypassing the ESD current. In this way, the ESD current passes through the ESD protection circuits rather than passes through inner circuits of the chip, thereby protecting the inner circuits of the chip from being damaged or interfered with by unwanted ESD events or current.

A conventional ESD protection circuit mainly includes an ESD transition detection circuit and a power clamp circuit. FIG. 1 is a diagram illustrating a conventional ESD protection circuit. As shown in FIG. 1, an ESD protection circuit 100 includes an ESD detection circuit 110 and a power clamp circuit 120. The ESD protection circuit 100 is coupled between a power pad $V_{DD}$ and a power pad $V_{SS}$. The power pad $V_{DD}$ here serves as a power source while the power pad $V_{SS}$ serves as a ground terminal.

Throughout the development of semiconductor elements, applying transistors having a smaller form factor has been a basic requirement of circuit design. As a result of the development of semiconductor processes from 18 micrometer semiconductors, to 13 micrometer semiconductors through to 65 nanometer semiconductors the thicknesses of gate oxides of semiconductor elements have been reduced. Further, for decreasing the required circuit area and cost, an ESD detection circuit of the ESD protection circuit applying a metal oxide semiconductor (MOS) capacitor complying with a nano scale process rather than a traditional capacitor element has been used.

Please refer to FIG. 2. FIG. 2 is a diagram illustrating a conventional ESD detection circuit 200. As shown in FIG. 2, an ESD detection circuit 200 includes a resistor-capacitor circuit 210 and an inverter 220. The ESD detection circuit 200 is implemented for generating an ESD trigger signal $I_{trigger}$. When the ESD detection circuit 200 detects an ESD event, the ESD trigger signal $I_{trigger}$ output from the ESD detection circuit 200 will turn from a low logic level (logic "0") into a high logic level (logic "1") for enabling the following ESD protecting operations (e.g., the operation of a power clamp circuit). The ESD detection circuit 200 is coupled between a first power pad $V_{DD}$ and a second power pad $V_{SS}$. The resistor-capacitor circuit 210 includes an impedance component 211 and a MOS capacitor 212, and the inverter 220 includes a NMOS transistor 222 and a PMOS transistor 221.

However, a gate oxide thickness of a MOS capacitor complying with the advanced nano scale process is thinner than that of a MOS capacitor complying with a conventional process and this thereby leads to the ESD detection circuit with excessive leakage current. The unwanted excessive leakage current probably makes the ESD protection circuit 200 to operate in error. For instance, a malfunction of the ESD protection circuit occurs due to the leakage current to thereby induce the ESD protection circuit to output the ESD trigger signal $I_{trigger}$ incorrectly and result in even more serious leakage current.

In most cases, leakage currents of the ESD protection circuit are due to the thin gate oxide thickness of the MOS capacitor 212 in the resistor-capacitor circuit 210 since the MOS capacitor 212 usually complies with a nano scale process. Excessive tunneling current occurs owing to the thin gate oxide thickness of the MOS capacitor 212, and the tunneling current pulls down a voltage level on a contact terminal 230 (i.e., a terminal couples to a control terminal of the PMOS transistor 221 and a control terminal of the NMOS transistor 222) to lead to the voltage level on the contact terminal 230 being lower than a voltage level on a first connection terminal of the PMOS transistor 221, wherein the first connection terminal of the PMOS transistor 221 is coupled to the power pad $V_{DD}$. The PMOS transistor 221 hence turns on and makes the ESD trigger signal $I_{trigger}$ convert from a low logic level into a high logic level in error, resulting in the following ESD protection components (e.g., clamp circuit) to operate erroneously.

In short, when no ESD event occurs, the said tunneling current of the MOS capacitor 212 pulls down the voltage level on the terminal 230 and causes the inverter 220 to fail to keep closed (turn off) correctly, thereby bringing out excessive unwanted leakage current.

Therefore, there is a need for providing an ESD detection circuit to eliminate the leakage current of the ESD protection circuits that apply electronic components of a nano scale process, especially to eliminate the unwanted leakage current of the ESD protecting circuit when no ESD event happens.

SUMMARY OF THE INVENTION

It is therefore an objective of the present invention to solve the aforementioned problems, and to provide ESD circuits with various circuit structures and methods thereof to eliminate the unwanted leakage current of the ESD detection circuit that occurs by virtue of using electronic components complying with a modern nano scale process. In addition, the ESD detection circuit disclosed in the present invention is coupled to a ground terminal indirectly via a bias circuit rather than directly coupled to the ground terminal. By applying the bias circuit, the present ESD protection circuit has a smaller voltage difference between two terminals of a MOS capacitor in a resistor-capacitor circuit and hence eliminates the excessive unwanted leakage current in the modern electronic circuits complying with an advanced nano scale process.

According to a first aspect of the present invention, an exemplary electrostatic discharge (ESD) detection circuit is provided. The electrostatic discharge (ESD) detection circuit includes a first power pad, a second power pad, a resistor-capacitor (RC) circuit, a trigger circuit, and a bias circuit. The first power pad is implemented for receiving a first supply voltage. The second power pad is implemented for receiving a second supply voltage, wherein a voltage level at the first supply voltage is different from a voltage level at the second supply voltage. The RC circuit includes an impedance component and a capacitive component; the impedance component is coupled between the first power pad and a first terminal, and the capacitive component is coupled between the first terminal and a second terminal, wherein the second terminal is not directly connected to the second supply voltage. The trigger circuit is coupled to the first power pad, the second power pad, and the RC circuit, and the trigger circuit is implemented for generating an ESD trigger signal according to a voltage level at the first terminal and a voltage level at the second terminal. The bias circuit is coupled between the first power pad and the second power pad and is implemented for providing a bias voltage to the second terminal.

According to a second aspect of the present invention, an exemplary ESD detecting method is provided. The ESD detecting method includes: providing a resistor-capacitor (RC) circuit, generating an ESD trigger signal according to a voltage level at a first terminal and a voltage level at a second terminal; and providing a bias voltage to the second terminal. The resistor-capacitor (RC) circuit includes an impedance component and a capacitive component. The impedance component is coupled between a supply voltage and the first terminal. The capacitive component is coupled between the first terminal and the second terminal, wherein the second terminal is not directly connected to a second supply voltage and a voltage level at the second supply voltage is different to a voltage level at the first supply voltage; generating an ESD trigger signal according to the voltage level at the first terminal and the voltage level at the second terminal; and providing a bias voltage to the second terminal.

By the disclosed ESD detection circuit and method thereof the leakage current of ESD detection circuit when no ESD events occur is eliminated and this therefore solves the problem for modern ESD detection circuit(s) of the ESD protection circuit applying electronic transistors having a thinner gate oxide thickness.

These and other objectives of the present invention will no doubt become obvious to those of ordinary skill in the art after reading the following detailed description of the preferred embodiment that is illustrated in the various figures and drawings.

DETAILED DESCRIPTION

Certain term are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
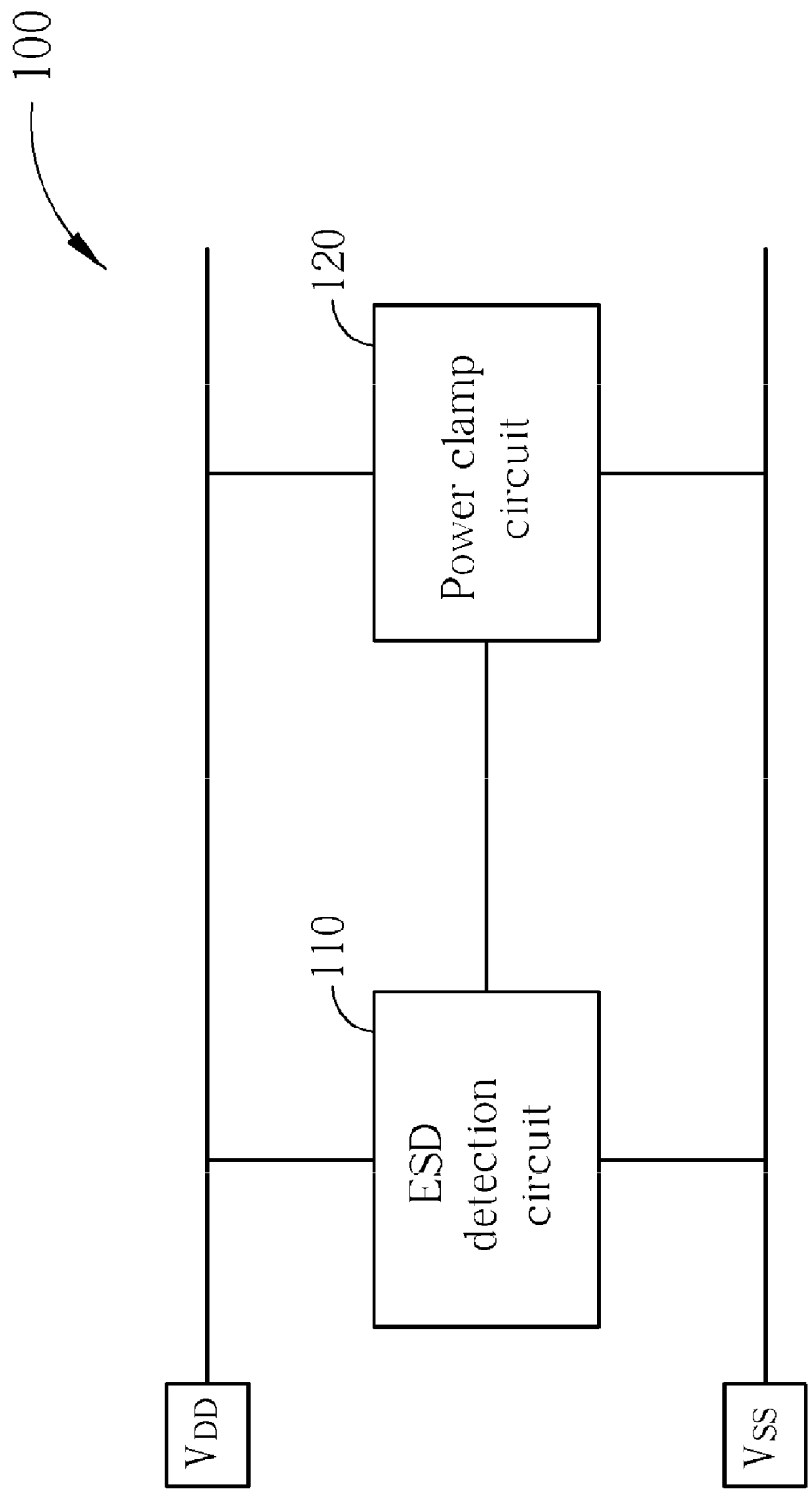
FIG. 1 is a diagram illustrating a conventional ESD protection circuit.
Figure 2:
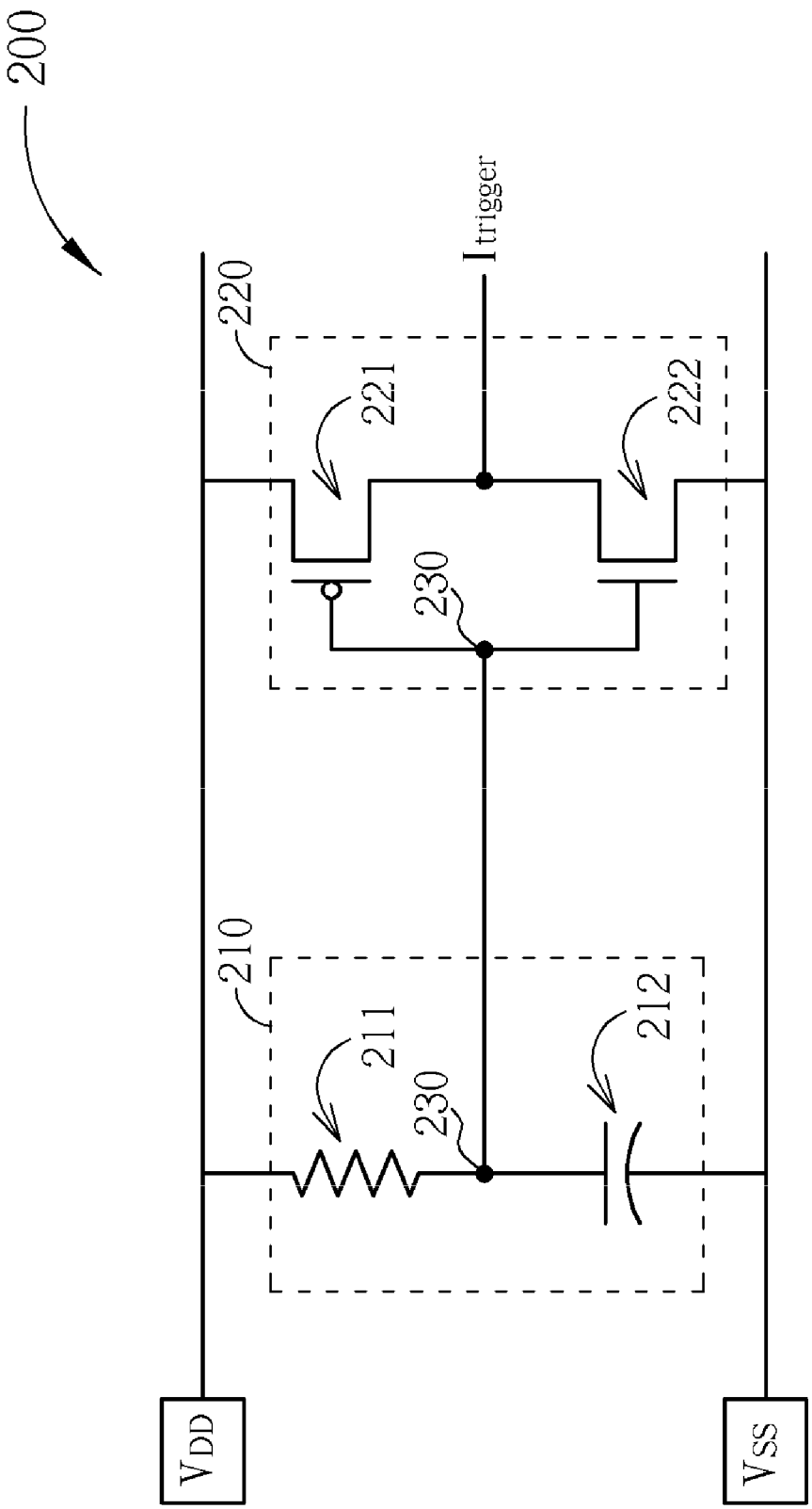
FIG. 2 is a diagram illustrating a conventional ESD detection circuit.
Figure 3:
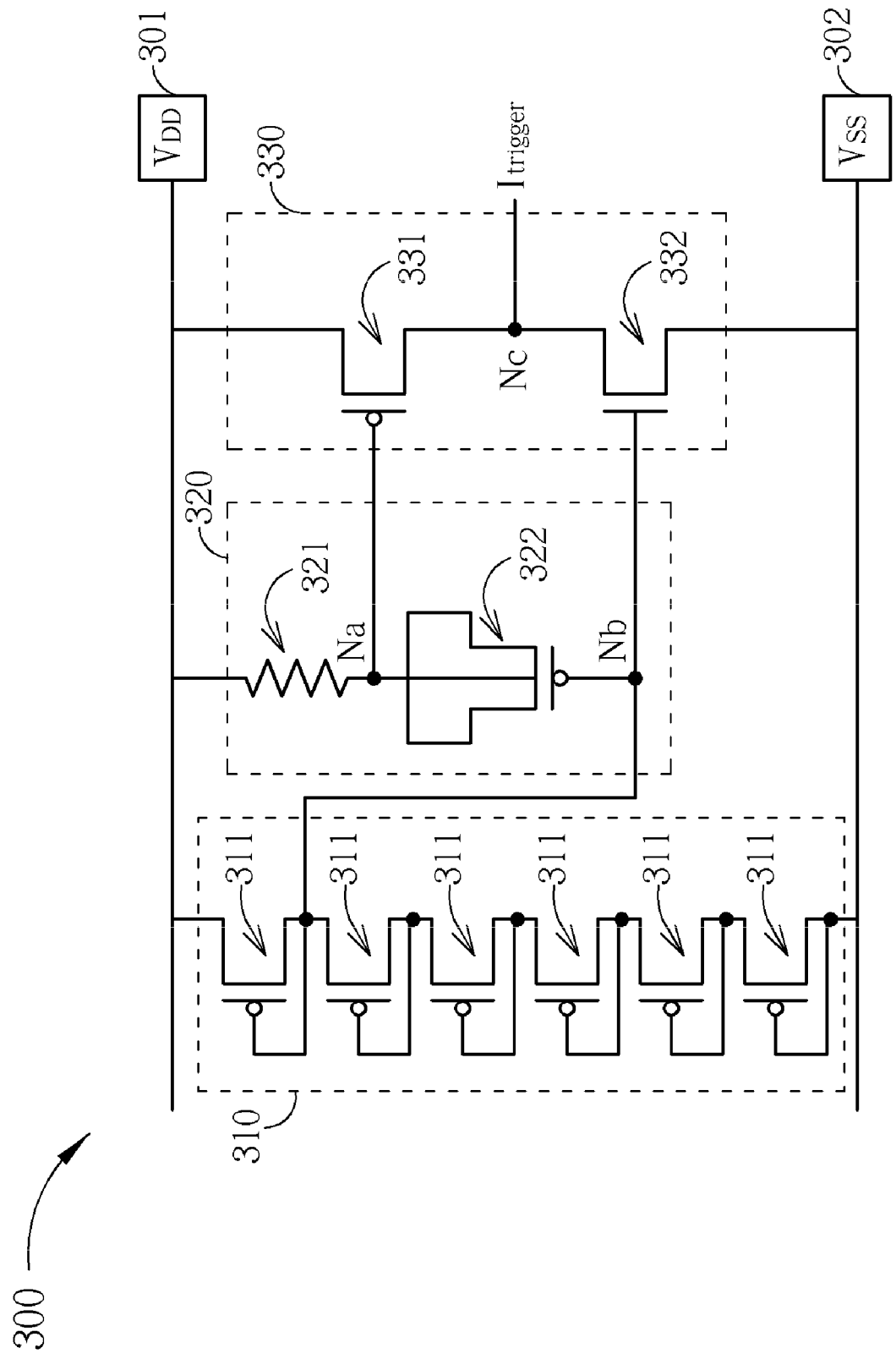
FIG. 3 is a diagram illustrating an ESD detection circuit according to a first exemplary embodiment of the present invention.

Please refer to FIG. 3. FIG. 3 is a diagram illustrating an electro-static discharge (ESD) detection circuit according to a first exemplary embodiment of the present invention. As shown in FIG. 3, the ESD detection circuit 300 is coupled between a first power pad 301 and a second power pad 302. In the following descriptions, the first power pad 301 is a power pad $V_{DD}$ for providing a first supply voltage $V_{DD}$. In addition, the second power pad 302 is a power pad $V_{SS}$ for providing a second supply voltage $V_{SS}$. The ESD detection circuit 300 includes a bias circuit 310, a resistor-capacitor (RC) circuit 320, and a trigger circuit 330.

In the following descriptions, the capacitive component of the RC circuit is a metal oxide semiconductor (MOS) capacitor and the impedance component of the RC circuit is a resistor. In addition, the trigger circuit of the ESD detection circuit includes different types of MOS transistors. That is, there are both N type MOS transistor(s) (NMOS transistor) and P type MOS transistor(s) (PMOS transistor) in the trigger circuit. Moreover, the provided ESD detection circuits and ESD detection method in the present invention apply components complying with a modern nano scale process. However, these are for illustrative purposes only, and are not meant to be limitations of the present invention.

As shown in FIG. 3, in the first exemplary embodiment, the RC circuit 320 includes an impedance component (a resistor 321) and a capacitive component, wherein the capacitive component here is a MOS capacitor 322 complying with an advanced nano scale process. The trigger circuit 330 includes a first MOS transistor 331 and a second MOS transistor 332. A control terminal (gate) of the first MOS transistor 331 is coupled to a first terminal Na, a first connection terminal (source) of the first MOS transistor 331 is coupled to the first power pad 301, and a second connection terminal (drain) of the first MOS transistor 331 is used to output an ESD trigger signal $I_{trigger}$ to the following ESD protecting components (e.g., the power clamp circuit) for enabling a bypass path of the ESD currents.

As shown in FIG. 3, the ESD trigger signal $I_{trigger}$ is outputted via a terminal Nc. In addition, a control terminal (gate) of the second MOS transistor 332 is coupled to a second terminal Nb, a first connection terminal (drain) of the second MOS transistor 332 is coupled to the second connection terminal (drain) of the first MOS transistor 331, and a second connection terminal (source) of the second MOS transistor 332 is coupled to the second power pad 302. In the first exemplary embodiment, the first MOS transistor 331 is a P type MOS (PMOS) transistor and the second MOS transistor 332 is an N type MOS (NMOS) transistor. That is, the first MOS transistor 331 and the second MOS transistor 332 are MOS transistors having different conductive types.

Comparing conventional ESD detection circuits (e.g., the conventional ESD detection circuit 200), the disclosed ESD detection 300 further includes a bias circuit 310. In the first exemplary embodiment, the bias circuit 310 is a voltage divider and is used to provide a bias voltage to a terminal of the MOS capacitor 322 (i.e., a second terminal Nb) according to both a supply voltage $V_{DD}$ of the first power pad 301 and a supply voltage $V_{SS}$ of the second power pad 302. Wherein a voltage level at the bias voltage is higher than a voltage level at the supply voltage $V_{SS}$ of the second power pad 302. In this way, a voltage difference between a first terminal (first terminal Na) of the MOS capacitor 322 and the second terminal Nb of the MOS capacitor 322 is lower than a voltage difference between the voltage level ($V_{DD}$) at the first power pad 301 and that ($V_{SS}$) at the second power pad 302.

As shown in FIG. 3, herein the bias circuit 310 is configured via five diode-connected transistors 311 and induces a voltage level at the second terminal Nb to be a voltage level between the first supply voltage $V_{DD}$ and the second supply voltage $V_{SS}$ expressed as $4/5(V_{DD}-V_{SS})$. However, the aforementioned structure of the bias circuit 310 is for illustrative purpose only and is not meant to be a limitation of the present invention. Any alternative structures of bias circuits for providing a divided voltage and applying different numbers of divided-voltage components to construct a voltage divider in the ESD detection circuit 300 obey the spirit of the present invention and belong to the scope of the present invention.

The detailed operations of the ESD detection circuit 300 under a normal state and under an ESD state are disclosed in the following descriptions.

When an ESD event occurs and consequently makes a voltage difference between the first power pad 301 and the second power pad 302 enlarge excessively. Due the response limitation of the capacitive component 322 (MOS capacitor), the voltage level at the first terminal of the first MOS transistor 331 at this time is higher than a voltage level at the control terminal of the first MOS transistor 331 and hence turns on the first MOS transistor 331 accordingly since the first MOS transistor 331 is a PMOS transistor.

In this way, the ESD trigger signal $I_{trigger}$ is outputted (turned from a low logic level "0" into a high logic level "1") when an ESD event occurs. Because the MOS capacitor 322 fails to immediately respond to the rapid voltage variance caused by the ESD events immediately, this induces a voltage level at the first terminal Na to keep its original voltage level ($V_{DD}$) temporally. The first MOS transistor 331 hence is turned on due to the voltage difference between the control terminal (gate) and the first connection terminal of the first MOS transistor 331, thereby boosting a voltage level at the terminal Nc for triggering (enabling) operations of a power clamp circuit (not shown) in the ESD protection circuit. Via the operation of the disclosed ESD detection circuit 320 mentioned above, the power clamp circuit of the ESD protection circuit enables and provides a bypass path with a low equivalent resistance for bypassing the unwanted ESD current to protect the inner circuit in a modern circuitry.

On the other hand, the bias circuit 310 also provides the second terminal Nb (the terminal of the capacitive component 322 near the second power pad 302) with a divided voltage when there is no ESD event; wherein a voltage level of the divided voltage is higher than a voltage level of the supply voltage $V_{SS}$ at the second power pad 302. As shown in FIG. 3, when there is no ESD event or current, the voltage level at the second terminal Nb enables the second MOS transistor 332 since the voltage level at the second terminal Nb provides the control terminal (gate) of the second MOS transistor 332 (NMOS transistor in this embodiment) with a required voltage level that is higher than the voltage level of the second power pad $V_{SS}$ (the voltage level at the second terminal of the MOS transistor 332).

In this manner, via appropriate adjustments according to different design requirements, the voltage difference between the first terminal Na and the second terminal Nb is ensured to be kept under a required range to thereby eliminate the unwanted leakage current on the MOS capacitor (capacitive component 322), for the MOS capacitor complying with an advanced nano scale process. Moreover, the voltage level at the first terminal Na thereby is allowed to approach a voltage level at the first supply voltage $V_{DD}$ (the voltage level at the first power pad 301). The first MOS transistor 331 is consequently kept disabled since the first MOS transistor 331 is a PMOS transistor. That is, in this way the first MOS transistor 331 is ensured to be disabled when there is no ESD event. This is due to the voltage difference between two terminals of the capacitive component 332 (MOS capacitor complying with an advanced nano scale process) now being ensured to be in a suitable range. The disclosed ESD detection circuit hence is free from enabling the ESD elements (e.g., power clamp) erroneously by the aforementioned excessive leakage current of the conventional ESD detection circuit.

Figure 4:
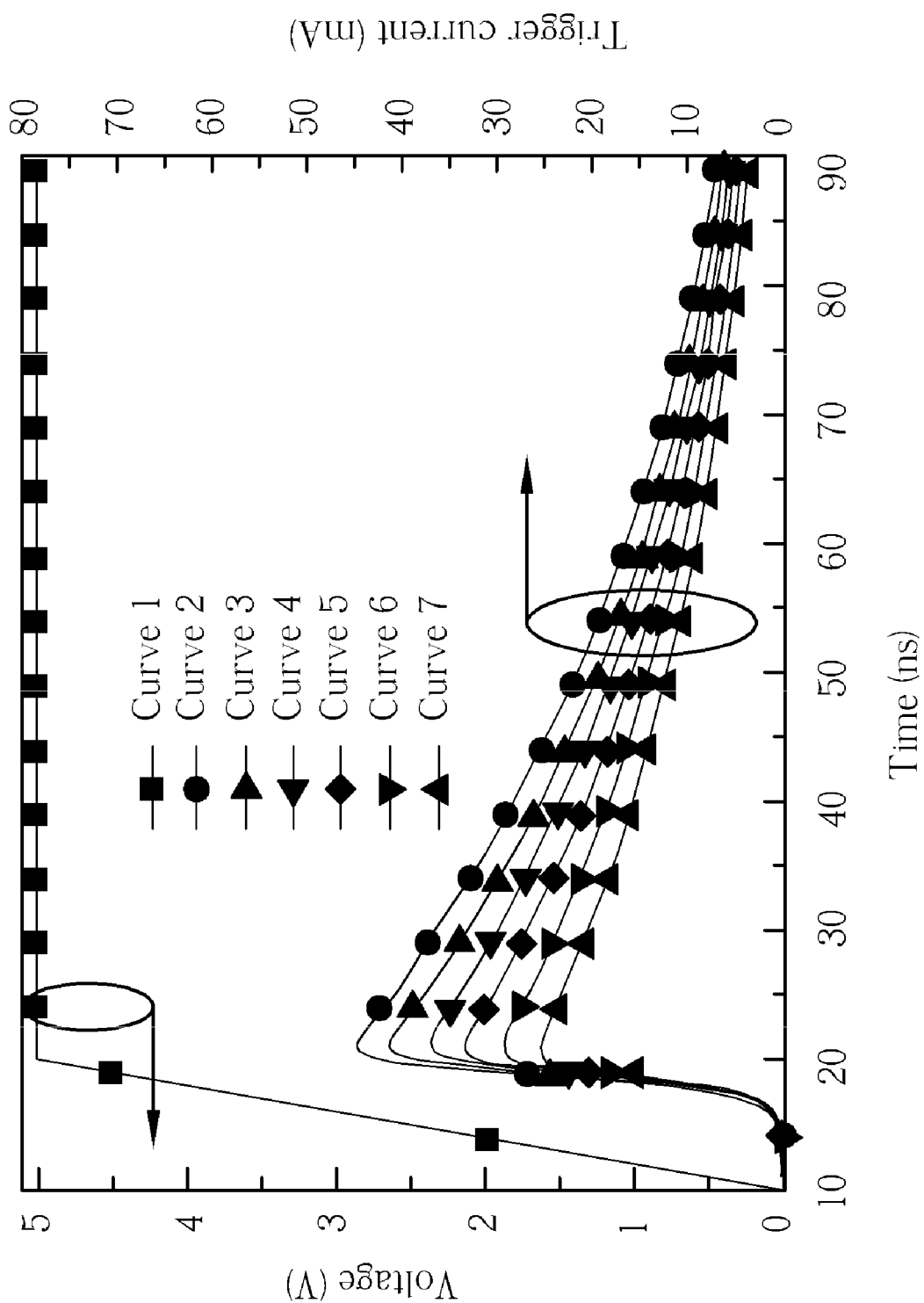
FIG. 4 is a diagram illustrating states of the ESD detection circuit of the first exemplary embodiment when there is an ESD event.
Figure 5:
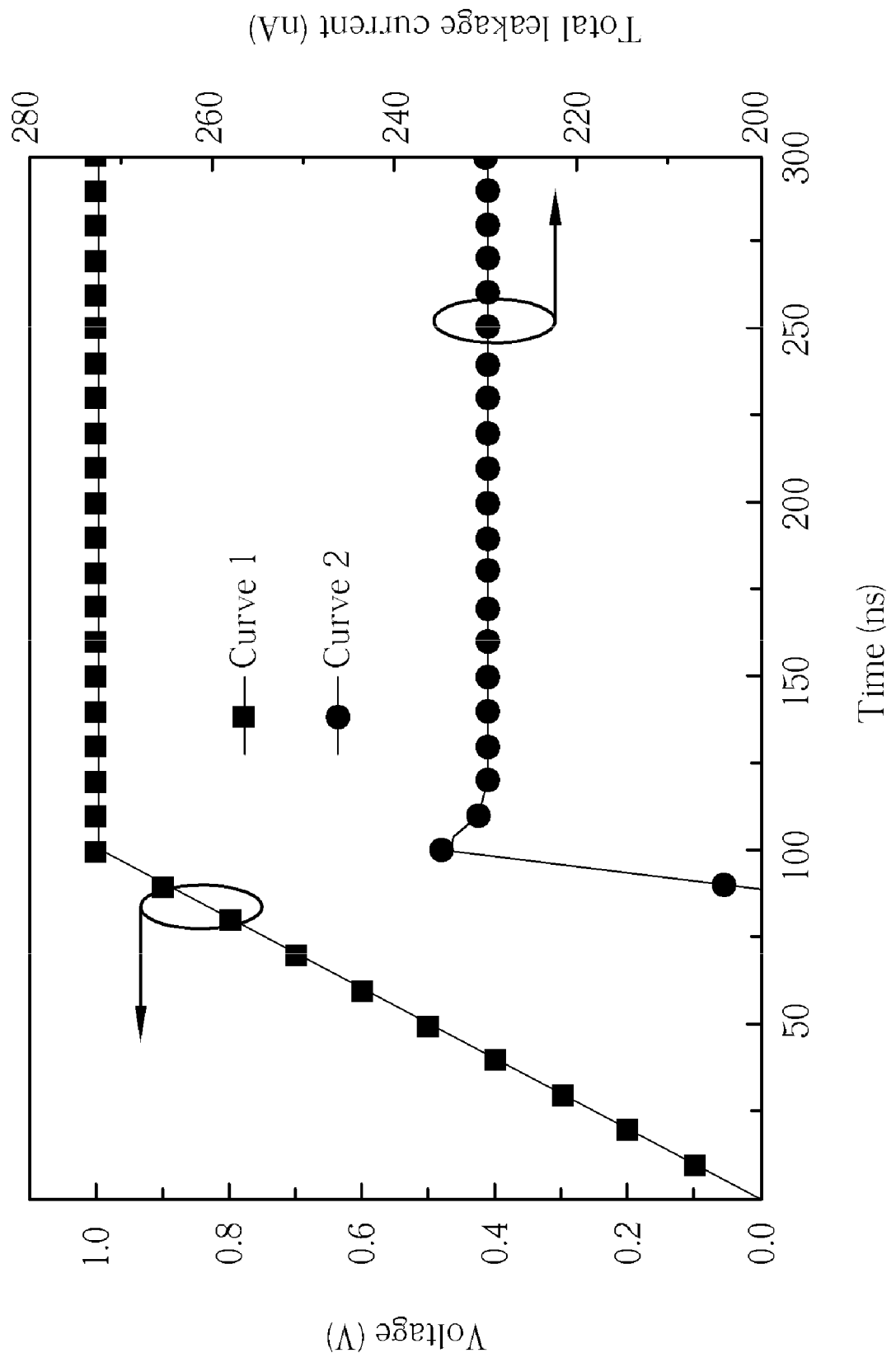
FIG. 5 is a diagram illustrating states of the ESD detection circuit of the first exemplary embodiment when there is no ESD event (i.e., under a normal operation).

Please refer to FIG. 4 in conjunction with FIG. 3. FIG. 4 is a diagram illustrating states of the ESD detection circuit of the first exemplary embodiment when there is an ESD event. As shown in FIG. 4, curve 1 to curve 7 respectively illustrate a characteristic curve while fixing a RC constant of the RC circuit 320 in the ESD detection circuit 300 as 50 nano second (ns), fixing a channel length (L) of the first MOS transistor 331 to be 0.12 um and varying the a channel width (W) of the first MOS transistor 331. Please refer to FIG. 5 in conjunction with FIG. 3. FIG. 5 is a diagram illustrating states of the ESD detection circuit of the first exemplary embodiment when there is no ESD event (i.e., under a normal state). As shown in FIG. 5, curve 1 and curve 2 respectively illustrate a characteristic curve of a total leakage current of the ESD detection circuit 300 in FIG. 3 while fixing a first supply voltage $V_{DD}$ as 1V.

From the aforementioned descriptions, applying the ESD detection circuit of the present invention can protect the under-protected circuits from being interfered with or damaged by the ESD currents and reduce the required circuit area as well when using the transistor elements (e.g., MOS capacitors) complying with an advanced nano scale process in circuit structures that with a thinner gate oxide thickness than the conventional transistor elements. In addition, the unwanted leakage current caused by the capacitive component of the ESD detection circuit for the most part is eliminated to thereby improve the performance of the whole ESD protection circuit of the advanced nano scale process.

Figure 6:
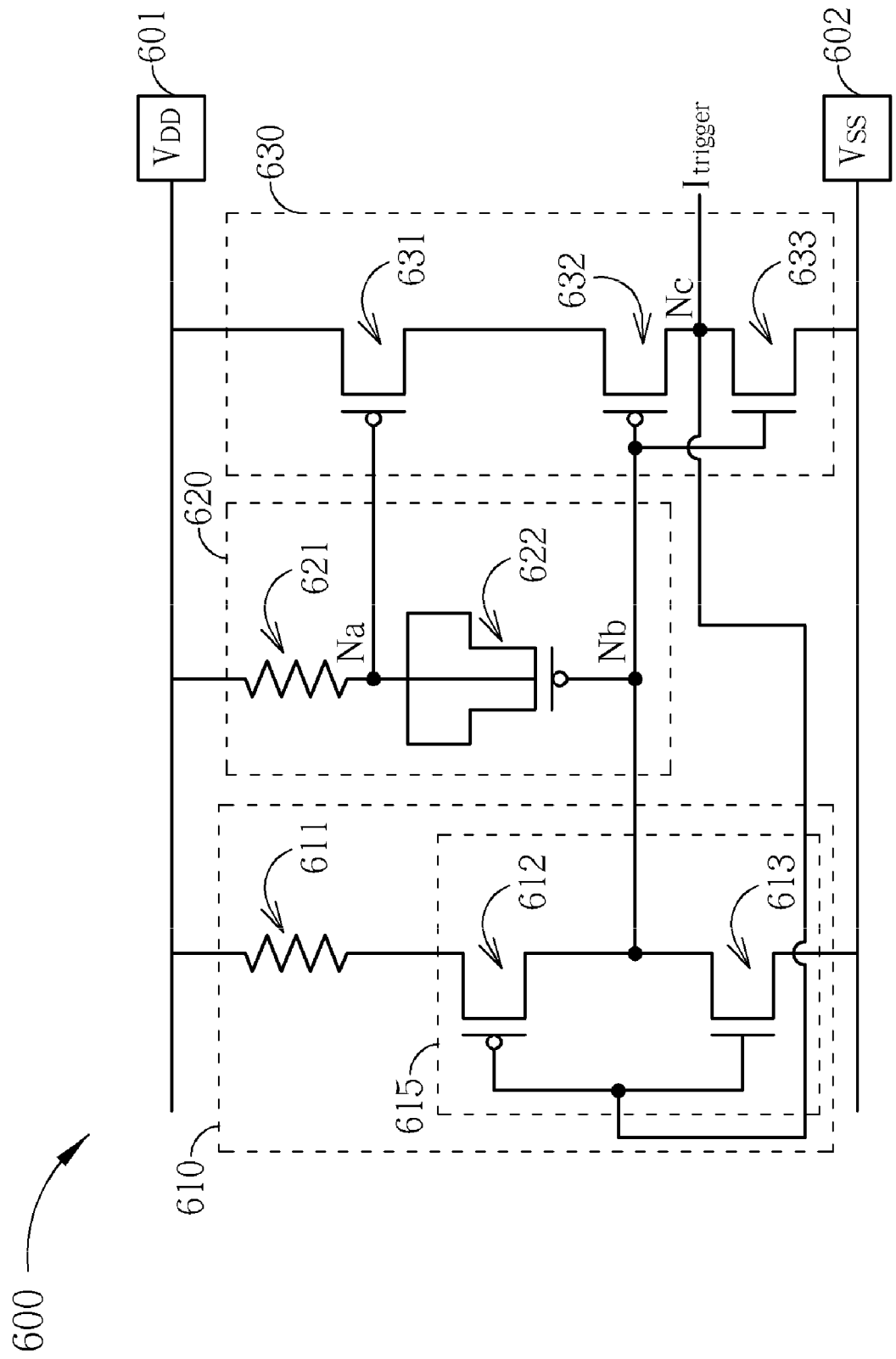
FIG. 6 is a diagram illustrating an ESD detection circuit according to a second exemplary embodiment of the present invention.

Please refer to FIG. 6. FIG. 6 is a diagram illustrating an ESD detection circuit according to a second exemplary embodiment of the present invention. As shown in FIG. 6, the ESD detection circuit 600 is coupled between a first power pad 601 and a second power pad 602. In this embodiment, the first power pad 601 provides a first supply voltage $V_{DD}$ and the second power pad 602 provides second supply voltage $V_{SS}$ (a ground voltage). The ESD detection circuit 600 includes a bias circuit 610, a resistor-capacitor (RC) circuit 620 and a trigger circuit 630.

As shown in FIG. 6, the RC circuit 620 is coupled between the first power pad 601 and a second terminal Nb. The RC circuit 620 includes an impedance component 621 and a capacitive component (e.g., a MOS capacitor). The trigger circuit 630 is coupled between the first power pad 601, a second power pad 602, the RC circuit 620 and the bias circuit 610.

Here the trigger circuit 630 includes two PMOS transistors 631 and 632 connected in series and further an NMOS transistor 633 to serve as a trigger inverter to guarantee the correctness of the logic function of the ESD protection circuit. As shown in FIG. 6, a control terminal (gate) of a first transistor 631 is coupled to the first terminal Na and a first connection terminal (source) of the first transistor 631 is coupled to the first power pad 601. A control terminal (gate) of the second transistor 632 is coupled to the second terminal Nb, a first connection terminal (source) of the second transistor 632 is coupled to a second connection terminal (drain) of the first transistor 631, and a second connection terminal (drain) of the second transistor 632 outputs an ESD trigger signal $I_{trigger}$ with a high logic level (logic "1") for enabling the following ESD elements (e.g., a power clamp circuit). The ESD trigger signal $I_{trigger}$ is outputted via a third terminal Nc. A control terminal (gate) of the third transistor 633 is coupled to the second terminal Nb, a first connection terminal (drain) of the third transistor 633 is coupled to a second connection terminal of the second transistor 632, and a second connection terminal (source) of the third transistor 633 is coupled to the second power pad 602.

In FIG. 6 the bias circuit 610 includes an inverter 615 and an impedance component 611; however the usage of the impedance component is for illustrative purposes only and not meant to be a limitation of the present invention. That is, the impedance component 611 is an optional element and can be omitted according to different design requirements; these alternative designs obey the spirit of the present invention and fall within the scope of the present invention.

The inverter 615 includes a PMOS transistor 612 and an NMOS transistor 613 and the inverter is coupled between the second terminal Nb and third terminal Nc (the second connection terminal of the second MOS transistor 632 and the first connection terminal of the third MOS transistor 633). In this embodiment, the trigger inverter constructed via the trigger circuit 630 and the inverter 615 in the bias circuit 630 lead to a feedback control scheme to the ESD detection circuit 600. The inverter 615 generates a bias voltage to the second terminal Nb according to the ESD trigger signal $I_{trigger}$ at the third terminal Nc and hence eliminates the voltage difference between two terminals of the capacitive component (MOS capacitor 622) via decreasing the voltage difference between the voltage level at the first terminal Na and at the second terminal Nb.

However, a voltage divider can be used as the bias circuit of the ESD detection circuit 600 in other exemplary embodiments of the present invention according to different design requirements. For example, the bias circuit 310 in FIG. 3 can replace the bias circuit 610 in the ESD detection circuit 600 as another exemplary embodiment. Various circuit constructions of the bias circuit of the ESD detection circuit 600 are allowable under different design requirements and these alternative designs obey the spirit of the present invention and fall within the scope of the present invention.

The operation states of the ESD detection circuits 600 under a normal state (without ESD currents) and while falling in with ESD currents are disclosed as follows.

Please refer to FIG. 6, when an ESD current occurs, the voltage difference between the first power pad 601 and the second power pad 602 rises rapidly and further turns on the first MOS transistor 631 of the trigger circuit 630 since the voltage difference between the control terminal (first terminal Na) and the first connection terminal of the first MOS transistor 631 increases due to an RC delay of the RC circuit 620. The second MOS transistor 632 of the trigger circuit 630 turns on consequently since a voltage level at the first connection terminal (drain) of the second MOS transistor 632 is pulled up after the enabling of the first transistor 631.

In this manner the voltage level at the third terminal Nc is pulled up through the enabling of the first transistor 631 and the second transistor 632 of the trigger circuit 630 to provide the ESD trigger signal $I_{trigger}$ with a high logic level (logic "1") to enable the following power clamp circuit (not shown) for bypassing the ESD currents. When the voltage level at the third terminal Nc increases, the raised voltage at the third terminal Nc transmits to the bias circuit 610 to thereby turn on the NMOS transistor 613 in the inverter 615. The enabling of the NMOS transistor 613 thereby pulls down the voltage level at the second terminal Nb (e.g., pulls the voltage level at the second terminal Nb down to approach the voltage level at the second supply voltage $V_{SS}$). The voltage difference between the MOS capacitor 622 is enlarged in this way and thereby results in excessive gate leakage current at the capacitive component 622 since the capacitive component is a MOS capacitor 622 complying with a nano scale process and hence with a gate oxide thickness thinner than that of a conventional MOS transistor. The excessive leakage current of the MOS capacitor 622 due to the enlarged voltage difference between the MOS capacitor 622 in this way pulls down the voltage of the first terminal Na. Thereby when an ESD event occurs, the voltage level at the first terminal Na (the control terminal (gate) of the first transistor 631) is lower than that of the first connection terminal (drain) of the first transistor 631 which turns on the first transistor 631 and so as the second transistor 632 provides the ESD trigger signal $I_{trigger}$ with high logic level (logic "1") for enabling the following power clamp circuit for bypassing the ESD current around the under-protected circuits.

Please refer to FIG. 6, the third MOS transistor 633 in the trigger circuit 630 is turned on when there are no ESD currents around the ESD detection circuit 600 to thereby pull down the voltage level at the third terminal Nc to approach the voltage level of the second supply voltage $V_{SS}$ provided by the second power pad 602. The low voltage level (logic "0") at the third terminal Nc hence enables the PMOS transistor 612 in the inverter 615 of the bias circuit 610 via the feedback structure of the ESD detection circuit 600, and thereby pulls up the voltage level at the second terminal Nb to approach the voltage level at the first power pad 601 (with a supply voltage $V_{DD}$).

Compared with conventional circuits, a voltage difference between the first terminal Na and the second terminal Nb is reduced since the voltage level at the first terminal Na approximates to the first supply voltage $V_{DD}$ as well as the voltage level at the second terminal Nb; the voltage levels of the first terminal Na and the second terminal Nb are both close to the voltage $V_{DD}$. In this manner, both of the gate leakage currents at the capacitive component (a MOS transistor 622 complying with a nano scale process and with a thin gate oxide thickness) are eliminated and the first MOS transistor 631 and the second MOS transistor 632 of the trigger circuit 630 are turned off effectively as well.

That is, when no ESD current occurs, the voltage difference between the MOS transistor 622 complying with a nano scale process (or any advanced process) is effectively eliminated and hence the erroneous ESD trigger signal $I_{trigger}$ triggering (enabling) the following power clamp circuit in error is avoided. The circuit structure of the ESD detection circuit 600 protects the circuit operations from malfunctions so as to avoid the ESD trigger signal $I_{trigger}$ with a wrong logic level.

Figure 7:
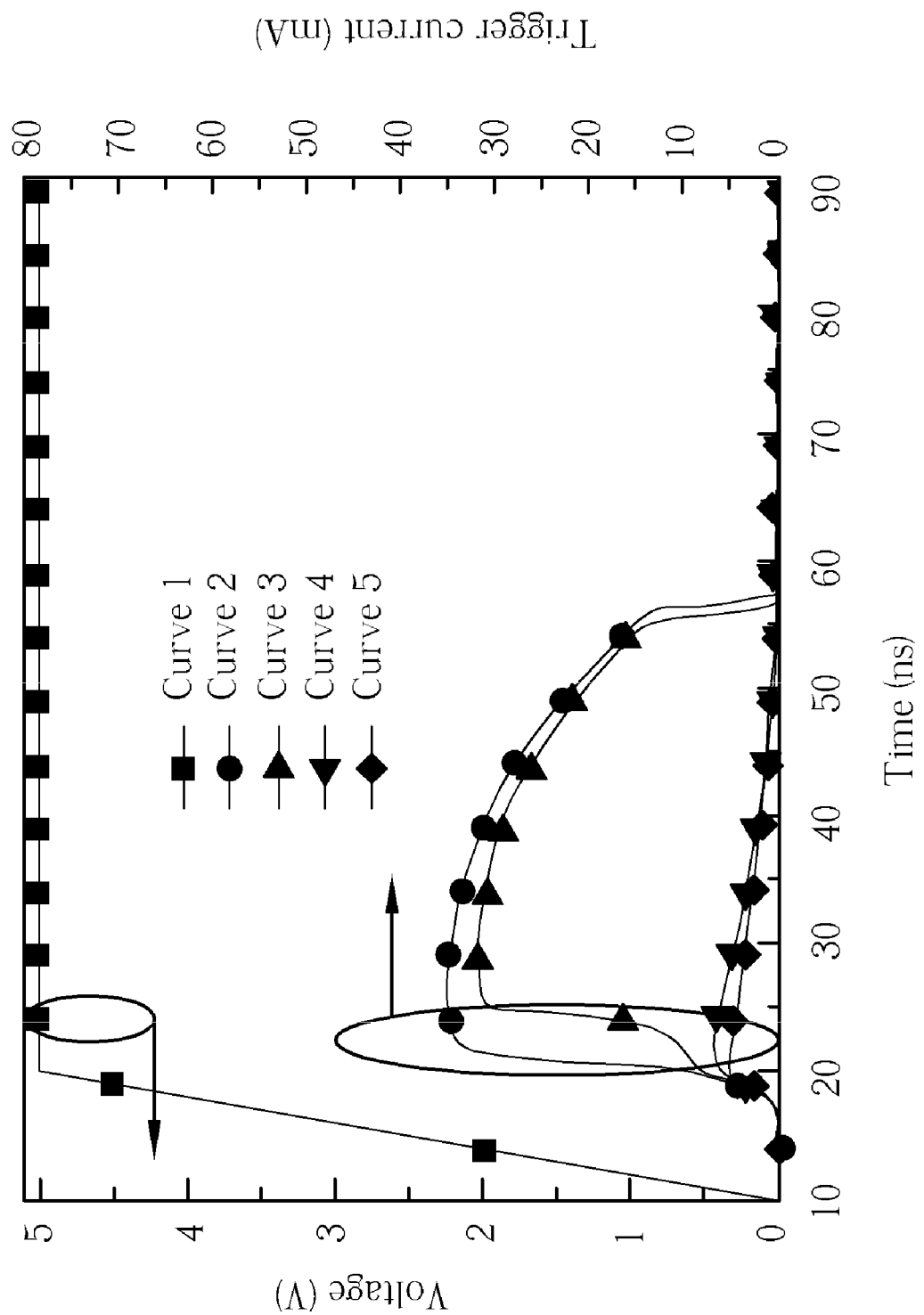
FIG. 7 is a diagram illustrating states of the ESD detection circuit of the second exemplary embodiment when there is an ESD event.
Figure 8:
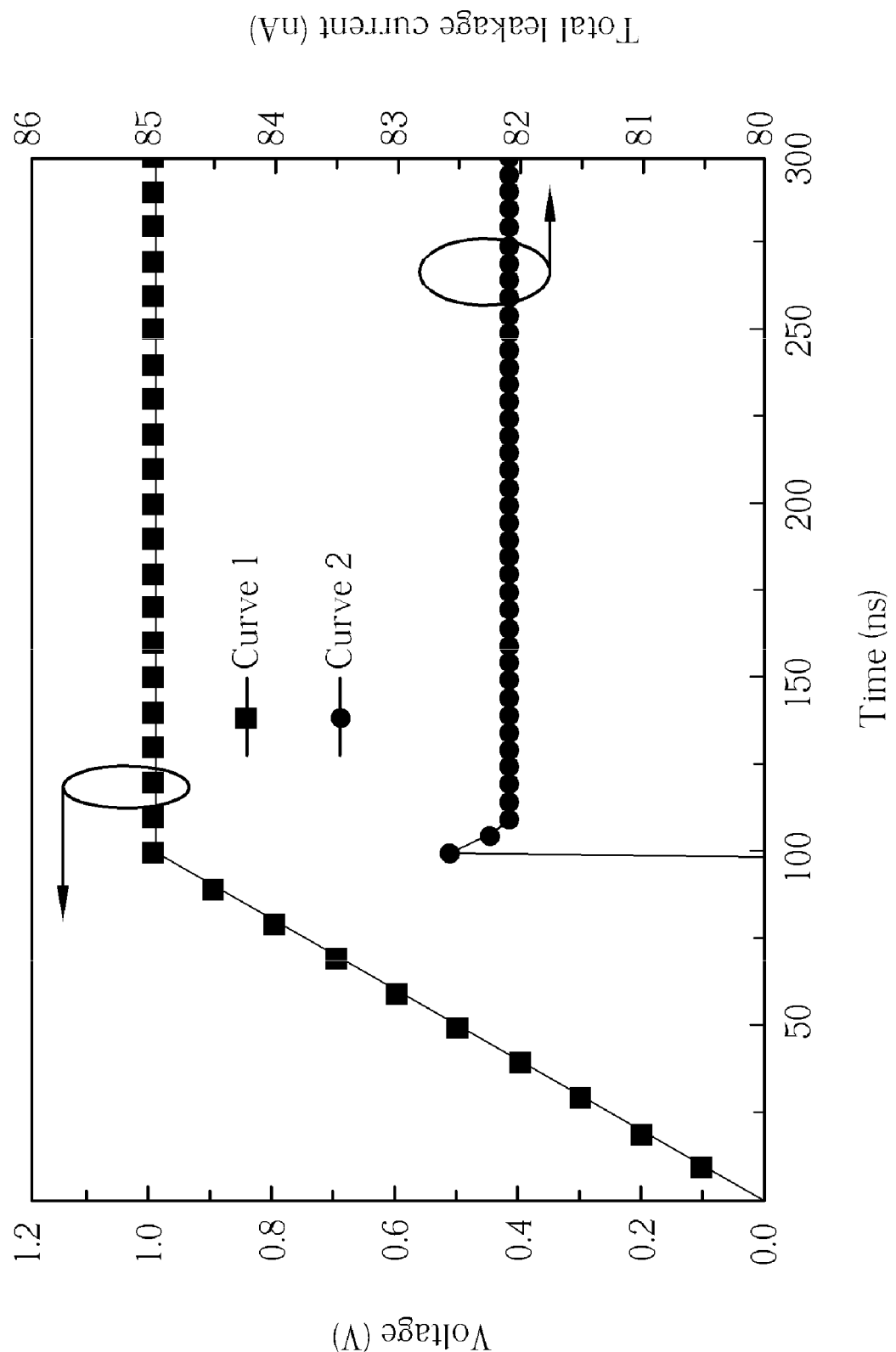
FIG. 8 is a diagram illustrating states of the ESD detection circuit of the second exemplary embodiment when there is no ESD event (under a normal state).

Please refer to FIG. 7 in conjunction with FIG. 6. FIG. 7 is a diagram illustrating states of the ESD detection circuit of the second exemplary embodiment when there is an ESD event. As shown in FIG. 7, curves 1 to curve 5 respectively illustrate a characteristic curve of the ESD detection circuit 600 when the RC time constant of the RC circuit 620 is fixed as 25 ns and modulates a channel length (L) of the first MOS transistor 631 and/or a channel width (W) of the second MOS transistor 632. Please refer to FIG. 8 in conjunction with FIG. 6. FIG. 8 is a diagram illustrating states of the ESD detection circuit of the second exemplary embodiment when there is no ESD event (under a normal state). As shown in FIG. 8, curve 1 and curve 2 respectively illustrate a characteristic curve of a total leakage current of the ESD detection circuit 600 while fixing a voltage level of the first supply voltage $V_{DD}$ as 1 V.

It is clear that for circuits applying transistors with thin gate oxide thickness (e.g., transistors complying with a nano scale process), the applied latch structure via the two inverter circuits (the inverter of the trigger circuit 630 and the inverter of the bias circuit 610) and the bias circuit 610 not only eliminate the unwanted excessive leakage current of the ESD detection circuit 600 but also enable the power clamp circuit via the ESD trigger signal $I_{trigger}$ to more rapidly to bypass the ESD current.

In the second exemplary embodiment, the disclosed ESD detection circuit 600 generates excessive gate leakage currents at the capacitive component 622 (MOS transistor in the present invention), the gate leakage current of the capacitive component 622 keeps enabling the first MOS transistor 631 and the second MOS transistor 632 of the trigger circuit 630. That is, the disclosed ESD detection circuit 600 keeps outputting the ESD trigger signal $I_{trigger}$ with required high logic level "1" to trigger the operation of the following ESD protection elements (e.g., the power clamp circuit) by using the characteristics (the excessive gate leakage current) of the MOS transistor complying with a nano scale process or an advanced process. The following ESD protection elements (power clamp circuit) are enabled via the ESD trigger signal $I_{trigger}$ by using the characteristics of the gate leakage current of the modern MOS transistors with a thin gate oxide thickness.

Furthermore, under suitable adjustment, the disclosed ESD detection circuit is allowed to keep the ESD protection ability while decreasing the RC time constant of the RC circuit of the second exemplary embodiment. The required circuit areas are further diminished and the cost is decreased as well.

However, the aforementioned disclosures are for illustrative purpose only and not meant to be limitations of the present invention, other alternative designs obey the spirits of the present invention and fall within the scope of the present invention. For example, in an alternative exemplary embodiment, the bias circuit 310 of FIG. 3 can be replaced with the bias circuit 610 in FIG. 6, and the impedance component 611 in the bias circuit 610 is an optional component only and can be omitted according to the design requirements.

In brief, the disclosed ESD detection circuit and ESD detection method thereof improves the ESD protection ability and keeps circuit area and cost acceptable by avoiding the RC circuit coupled to the ground terminal (the second power pad $V_{SS}$) directly to hence prevent the capacitive component of the RC circuit from making erroneous ESD operation via the large voltage difference between the two terminals of the capacitive component. However, the circuit structures of the aforementioned ESD detection circuit can be replaced by other equivalent circuits with suitable adjustments. For instance, in an alternative ESD detection circuit of the first exemplary embodiment, resistors can be applied as the voltage dividing components to provide the capacitive component of the RC circuit with a voltage level different from the second supply voltage $V_{SS}$. That is, any alternative circuits that decrease the voltage difference between the RC circuit via the disclosed technique of the present invention to provide the capacitive component a voltage level different from the second supply voltage $V_{SS}$ to thereby improve the malfunction of the ESD protection circuit under the normal state (no ESD event occurs) due to the excessive gate leakage current fall within the scope of the present invention.

Those skilled in the art will readily observe that numerous modifications and alterations of the device and method may be made while retaining the teachings of the invention.

What is claimed is:

1. An electro-static discharge (ESD) detection circuit, comprising:
   a first power pad, for receiving a first supply voltage;
   a second power pad, for receiving a second supply voltage, wherein a voltage level at the first supply voltage is different from a voltage level at the second supply voltage;
   a resistor-capacitor (RC) circuit, comprising:
      an impedance component, coupled between the first power pad and a first terminal; and
      a capacitive component, coupled between the first terminal and a second terminal, wherein the second terminal is not directly connected to the second supply voltage;
   a trigger circuit, coupled to the first power pad, the second power pad, and the RC circuit, for generating an ESD trigger signal according to a voltage level at the first terminal and a voltage level at the second terminal; and
   a bias circuit, coupled between the first power pad and the second power pad, for providing a bias voltage to the second terminal.

2. The ESD detection circuit of claim 1, wherein a voltage level of the bias voltage is between the voltage level of the first supply voltage and the voltage level of the second supply voltage.

3. The ESD detection circuit of claim 1, wherein the capacitive component is a metal oxide semiconductor (MOS) capacitor complying with a nano scale process.

4. The ESD detection circuit of claim 1, wherein the bias circuit is a voltage divider configured for generating a divided voltage to serve as the bias voltage according to the first supply voltage and the second supply voltage.

5. The ESD detection circuit of claim 1, wherein the trigger circuit comprises:
   a first metal oxide semiconductor (MOS) transistor, having a control terminal coupled to the first terminal, a first connection terminal coupled to the first power pad, and a second connection terminal for outputting the ESD trigger signal; and a second MOS transistor, having a control terminal coupled to the second terminal, a first connection terminal coupled to the second connection terminal of the first MOS transistor, and a second connection terminal coupled to the second power pad, wherein the first MOS transistor is a MOS transistor with a first conductivity type and the second MOS transistor is a MOS transistor with a second conductivity type.

6. The ESD detection circuit of claim 5, wherein the bias circuit comprises:
an inverter, coupled between the second terminal and the second connection terminal of the first MOS transistor, for generating the bias voltage according to the ESD trigger signal.

7. The ESD detection circuit of claim 1, wherein the trigger circuit comprises:
a first metal oxide semiconductor (MOS) transistor, having a control terminal coupled to the first terminal, a first connection terminal coupled to the first power pad;
a second MOS transistor, having a control terminal coupled to the second terminal, a first connection terminal coupled to a second connection terminal of the first MOS transistor, and a second connection terminal for outputting the ESD trigger signal; and
a third MOS transistor, having a control terminal coupled to the second terminal, a first connection terminal coupled to the second connection terminal of the second MOS transistor, and a second connection terminal coupled to the second power pad;
wherein each of the first MOS transistor and the second MOS transistor is a MOS transistor with a first conductive type, and the third MOS transistor is a MOS transistor with a second conductive type.

8. The ESD detection circuit of claim 7, wherein the bias circuit comprises:
an inverter, coupled between the second terminal and the second terminal of the second MOS transistor, for generating the bias voltage according to the ESD trigger signal.

9. An ESD detecting method, comprising:
providing a resistor-capacitor (RC) circuit comprising:
an impedance component, coupled between a first supply voltage and a first terminal; and
a capacitive component, coupled between the first terminal and a second terminal, wherein the second terminal is not directly connected to a second supply voltage and a voltage level of the second supply voltage is different from a voltage level of the first supply voltage;
generating an ESD trigger signal according to a voltage level at the first terminal and a voltage level at the second terminal; and
providing a bias voltage to the second terminal.

10. The ESD detecting method of claim 9, further comprising:
setting a voltage level of the bias voltage between the voltage level of the first supply voltage and the voltage of the second supply voltage.

11. The ESD detecting method of claim 9, wherein the capacitive component is a metal oxide semiconductor (MOS) capacitor complying with a nano scale process.

12. The ESD detecting method of claim 9, wherein providing the bias voltage to the second terminal comprises:
generating a divided voltage to serve as the bias voltage according to the first supply voltage and the second supply voltage.

13. The ESD detecting method of claim 9, wherein generating the ESD trigger signal according to the voltage level at the first terminal and the voltage level at the second terminal comprises:
providing a first metal oxide semiconductor (MOS) transistor having a control terminal coupled to the first terminal, a first connection terminal coupled to the first supply voltage, and a second connection terminal for outputting the ESD trigger signal; and
providing a second MOS transistor having a control terminal coupled to the second terminal, a first connection terminal coupled to the second connection terminal of the first MOS transistor, and a second connection terminal coupled to the second power pad, wherein the first MOS transistor is a MOS transistor with a first conductivity type and the second MOS transistor is a MOS transistor with a second conductivity type.

14. The ESD detecting method of claim 13, wherein providing the bias voltage to the second terminal comprises:
generating the bias voltage by inverting the ESD trigger signal.

15. The ESD detecting method of claim 9, wherein generating the ESD trigger signal according to the voltage level at the first terminal and the voltage level at the second terminal comprises:
providing a first metal oxide semiconductor (MOS) transistor having a control terminal coupled to the first terminal and a first connection terminal coupled to the first power pad;
providing a second MOS transistor having a control terminal coupled to the second terminal, a first connection terminal coupled to a second connection terminal of the first MOS transistor, and a second connection terminal for outputting the ESD trigger signal; and
providing a third MOS transistor having a control terminal coupled to the second terminal, a first connection terminal coupled to the second connection terminal of the second MOS transistor, and a second connection terminal coupled to the second power pad;
wherein each of the first MOS transistor and the second MOS transistor is a MOS transistor with a first conductive type, and the third MOS transistor is a MOS transistor with a second conductive type.

16. The ESD detecting method of claim 15, wherein providing the bias voltage to the second terminal comprises:
generating the bias voltage by inverting the ESD trigger signal.

* * * * *